(12) United States Patent
Chuc et al.

(10) Patent No.: US 8,888,047 B2
(45) Date of Patent: Nov. 18, 2014

(54) DE-ICING SYSTEM FOR A FIXED OR ROTARY AIRCRAFT WING

(75) Inventors: Charles Chuc, Marseilles (FR); Nicolas Imbert, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 448 days.

(21) Appl. No.: 13/240,838

(22) Filed: Sep. 22, 2011

(65) Prior Publication Data

US 2012/0074262 A1 Mar. 29, 2012

(30) Foreign Application Priority Data

Sep. 28, 2010 (FR) ...................... 10 03827

(51) Int. Cl.
*B64D 15/16* (2006.01)
*B64D 15/00* (2006.01)
*B06B 1/06* (2006.01)
*B64C 27/04* (2006.01)
*B64C 27/473* (2006.01)

(52) U.S. Cl.
CPC ............ *B64D 15/163* (2013.01); *B06B 1/0622* (2013.01); *B64C 27/04* (2013.01); *B64C 27/473* (2013.01)
USPC ....................... 244/134 R; 310/334

(58) Field of Classification Search
USPC ....... 244/134 R, 134 D, 134 F, 134 A, 134 E; 310/334; 134/184
See application file for complete search history.

(56) References Cited

U.S. PATENT DOCUMENTS

| | | | | |
|---|---|---|---|---|
| 3,809,341 A | * | 5/1974 | Levin et al. ............... | 244/134 R |
| 4,277,711 A | * | 7/1981 | Hanafy ...................... | 310/334 |
| 4,277,712 A | * | 7/1981 | Hanafy ...................... | 310/334 |
| 4,385,255 A | * | 5/1983 | Yamaguchi et al. .......... | 310/335 |
| 4,545,553 A | * | 10/1985 | Finke et al. ............... | 244/134 D |
| 4,690,353 A | * | 9/1987 | Haslam et al. .............. | 244/134 D |
| 4,704,556 A | * | 11/1987 | Kay .......................... | 310/334 |
| 4,732,351 A | | 3/1988 | Bird | |
| 5,376,859 A | * | 12/1994 | Kim et al. ................... | 310/334 |
| 5,655,276 A | * | 8/1997 | Pattanayak et al. .......... | 29/25.35 |
| 5,744,898 A | * | 4/1998 | Smith et al. ................ | 310/334 |
| 6,566,265 B2 | * | 5/2003 | Esashi et al. ............... | 438/689 |

(Continued)

FOREIGN PATENT DOCUMENTS

FR 2908738 A1 5/2008

OTHER PUBLICATIONS

Search Report and Written Opinion; Application No. FR 1003827: dated Jun. 9, 2011.

*Primary Examiner* — Joseph W Sanderson
(74) *Attorney, Agent, or Firm* — Brooks Kushman P.C.

(57) ABSTRACT

A de-icing system for a fixed or rotary aircraft wing. The system is capable of generating ultrasound that is transmitted at least locally to an outside surface of the wing, wherein the system comprising a base structure (2) covered at least locally with at least one leading edge (3), an elastomer structure (1) arranged and secured between the base structure (2) and the leading edge (3), housings (4) defined in the elastomer structure (1) and open towards the leading edge (3), piezoelectric actuators arranged in at least some of the housings (4) in order to generate ultrasound, wiring (10) connecting the piezoelectric actuators to an electrical control and power supply unit, and a fastener for fastening the leading edge (3) onto the base structure (2) while coming into contact with the piezoelectric actuators (4a) arranged in their respective housings (4).

20 Claims, 3 Drawing Sheets

(56) References Cited

U.S. PATENT DOCUMENTS

| | | | |
|---|---|---|---|
| 7,148,607 B2 * | 12/2006 | Sato | 310/334 |
| 7,316,059 B2 * | 1/2008 | Sato | 29/594 |
| 7,382,082 B2 * | 6/2008 | Bhardwaj | 310/357 |
| 7,449,821 B2 * | 11/2008 | Dausch | 310/364 |
| 7,667,374 B2 * | 2/2010 | Aono et al. | 310/334 |
| 7,708,227 B2 * | 5/2010 | Al-Khalil | 244/134 D |
| 7,830,069 B2 * | 11/2010 | Lukacs et al. | 310/334 |
| 7,854,412 B2 * | 12/2010 | Al-Khalil | 244/134 R |
| 7,913,952 B2 * | 3/2011 | Boschet et al. | 244/134 D |
| 8,146,866 B2 * | 4/2012 | Tenebre et al. | 244/134 R |
| 8,217,554 B2 * | 7/2012 | Royer et al. | 310/333 |
| 8,674,587 B2 * | 3/2014 | Togasaki et al. | 310/334 |
| 2004/0011134 A1 * | 1/2004 | Sato | 73/632 |
| 2006/0119222 A1 * | 6/2006 | Sato | 310/334 |
| 2007/0182287 A1 * | 8/2007 | Lukacs et al. | 310/334 |
| 2007/0222338 A1 * | 9/2007 | Aono et al. | 310/334 |
| 2007/0222339 A1 * | 9/2007 | Lukacs et al. | 310/335 |
| 2008/0116765 A1 * | 5/2008 | Sugiura et al. | 310/334 |
| 2010/0031972 A1 | 2/2010 | Royer, Jr. | |
| 2010/0294882 A1 * | 11/2010 | Gantie et al. | 244/1 N |
| 2012/0074262 A1 * | 3/2012 | Chuc et al. | 244/134 A |

* cited by examiner

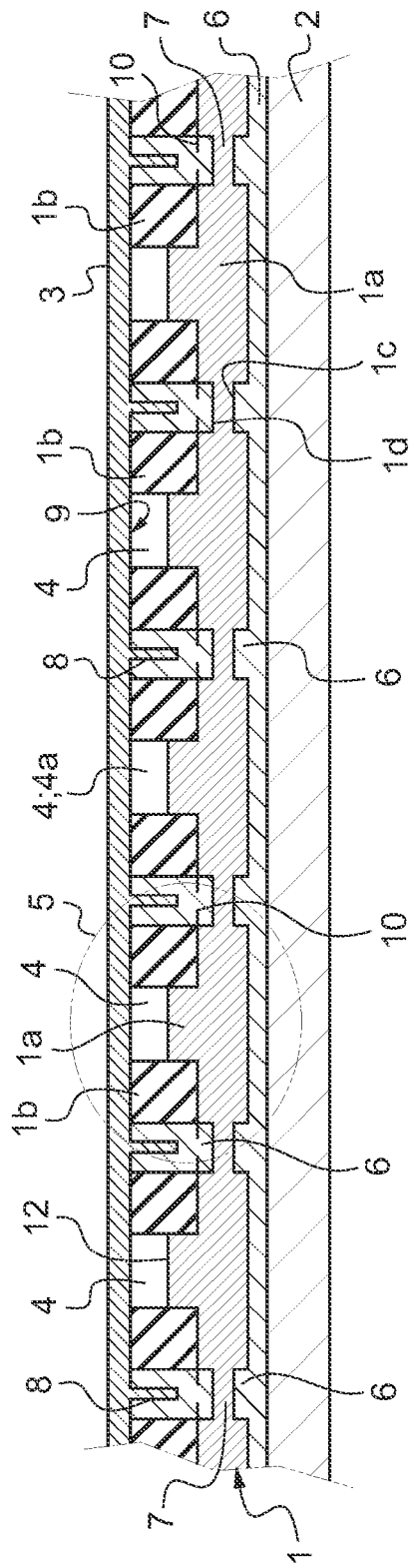
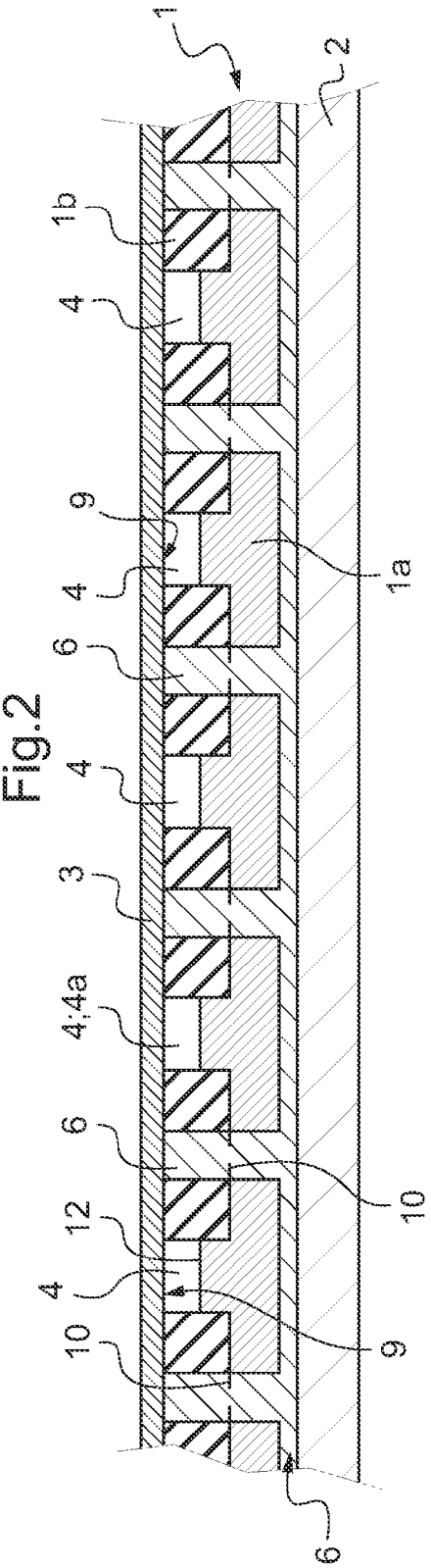

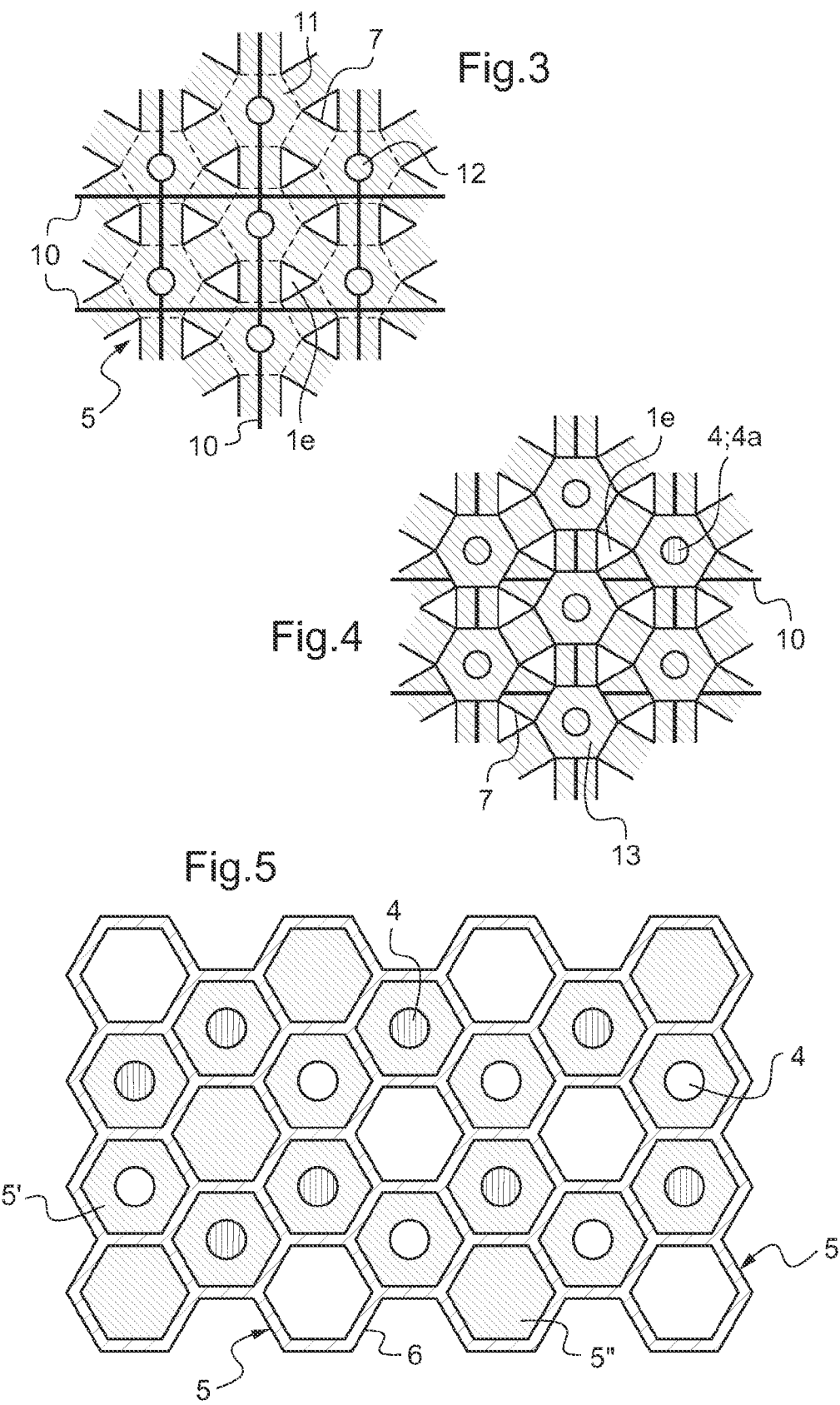

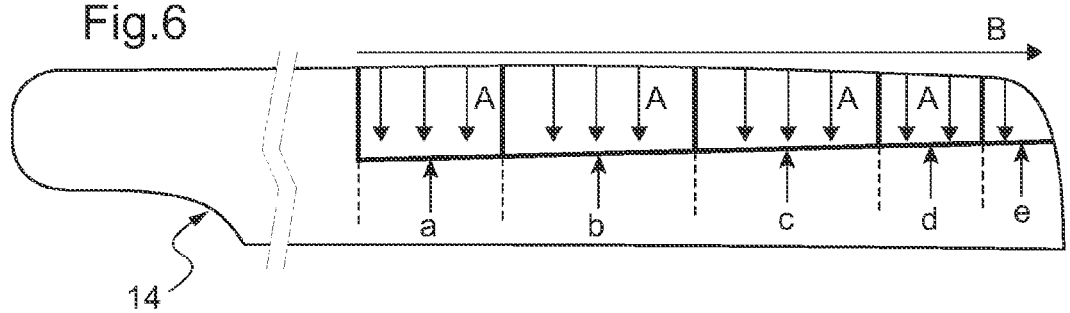
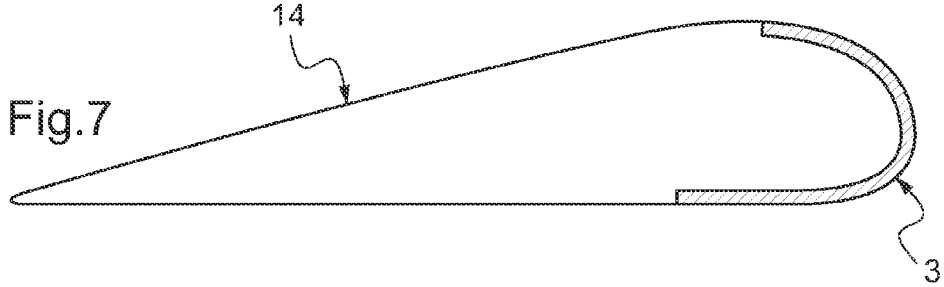
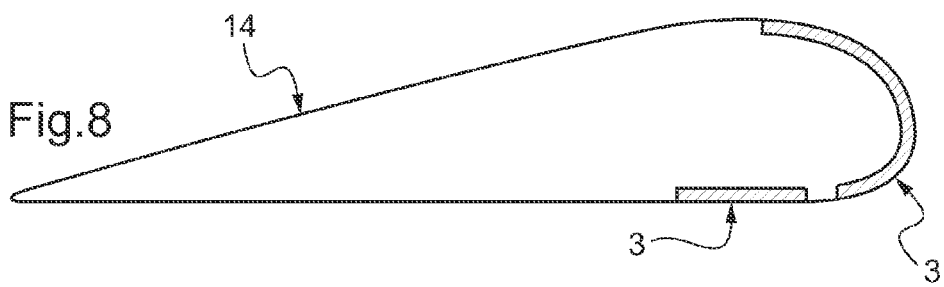
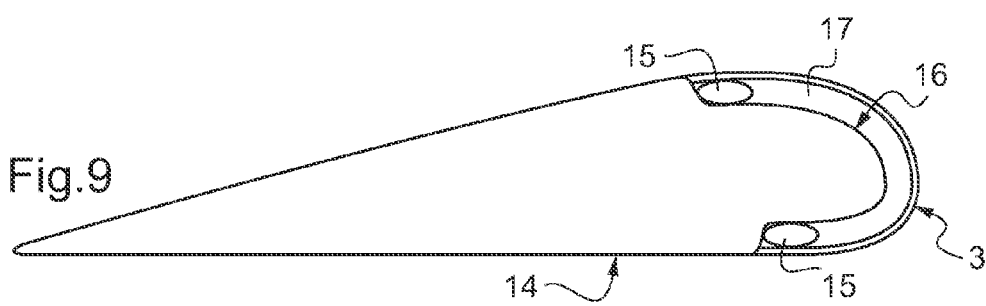
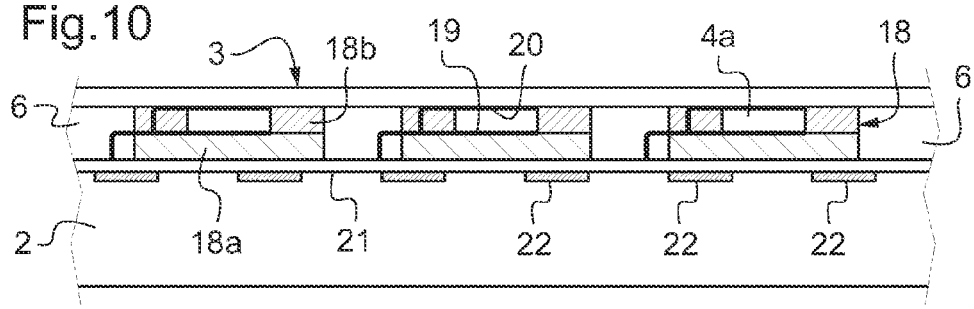

DE-ICING SYSTEM FOR A FIXED OR ROTARY AIRCRAFT WING

CROSS REFERENCE TO RELATED APPLICATIONS

This application claims priority to French Patent Application No. FR 10 03827 filed Sep. 28, 2010, the disclosure of which is incorporated in its entirety by reference herein.

BACKGROUND OF THE INVENTION (1) Field of the Invention

The present invention relates to the general technical field of de-icing aircraft structures, and in particular fixed or rotary wings.

(2) Description of Related Art

The invention relates more particularly to de-icing by ultrasound, i.e. transmitting ultrasonic mechanical vibration over a structure that is to be de-iced and/or, where appropriate, to be cleaned. In addition to being covered in ice, the above-mentioned structures might equally well be covered in a deposit of dust that needs to be removed.

The present invention is described mainly with reference to aircraft of the rotorcraft type, and in particular to helicopters, however it is applicable to aircraft of all types, whether fixed wing or rotary wing.

Various de-icer technologies already exist. Thus, electro-thermal de-icers are known that are used on helicopters. Such de-icers comprise electrical resistances embedded in the leading edges of the blades. The electrical resistances use the Joule effect to convert electrical energy that is supplied to them into heat. The heat serves to raise the temperature of the leading edge above temperatures that are favorable for ice formation.

Nevertheless, those de-icers present certain drawbacks, in particular for application to rotorcraft of the helicopter kind. Some de-icers consume large amounts of electrical power, for example power lying in the range 10 kilowatts (kW) to 40 kW. Such de-icers are also heavy and bulky because of the large amount of electrical power that is needed for their operation. Under such conditions, such de-icers cannot be installed on small machines. Furthermore, de-icers require the use of numerous parallel slip rings and brushes. Such de-icers therefore constitute systems that are complex and very expensive.

Such de-icers are also made heavier because of their control portions, i.e. the electronics used for controlling them, which electronics occupy a non-rotary frame of reference.

Furthermore, in the event of the electrical temperature control drifting, such de-icers can lead to the temperature drifting and consequently to the leading edge delaminating. Naturally it is possible to counter that problem by using a thermal protection device embedded in the blade. However such an additional protection device significantly increases the cost of the de-icer and also its on-board weight, which is not desirable.

Ultrasound de-icers are also known that serve to de-ice a structure by applying shear to the ice by means of said ultrasound. An example of the general principle of how such de-icers operate is described for example in document US 2010/0031972. That document describes in particular the use of piezoelectric actuators and also their modes of excitation in order to maximize effectiveness in transmitting ultrasonic waves without affecting the structure that is to be de-iced.

Such de-icers, e.g. based on ceramic elements, present the drawback of not being suitable for being incorporated in structures such as the leading edges of helicopter blades.

Leading edges are generally mechanically fastened integrally and in very rigid manner onto a base structure, and the adhesives used for holding said leading edges in place block the vibrating elements and thus prevent them from transmitting their energy. Arranging de-icers in the vicinity of surfaces for de-icing is also made difficult by the fact that there is little space available under the leading edge.

Another drawback of ultrasound de-icers is associated with incorporating them in blades. Loose wiring used for making connections to such actuators gives rise to uncontrolled volumes of air and also to zones in which the adhesive or the resin does not polymerize. Exothermic portions may also appear during fabrication of blades.

All of those drawbacks increase the risk of a leading edge being lost in flight, thereby constituting a situation that is catastrophic for a helicopter.

Furthermore, it should be observed that the ceramic elements used in known ultrasound de-icers need to be prestressed.

The ceramic elements are prestressed in order to protect them from certain forces to which they are particularly sensitive (twisting type forces and more generally any forces off their main axes). Furthermore, prestress does not enable them to exceed their mechanical limits in operation, and the ceramic elements may be damaged if those limits are exceeded.

SUMMARY OF THE INVENTION

An object of the present invention is thus to propose a de-icing system that enables the above-mentioned limitations to be overcome.

Consequently, the present invention seeks to incorporate an ultrasound de-icing system in a wing, e.g. a rotor blade, without thereby weakening the fastening of a leading edge.

Another object of the present invention seeks to propose a de-icing system that makes it possible to simplify operations of incorporating said system in a structure such as a main rotor blade or a fixed wing.

Another object of the present invention seeks to propose a novel de-icing system that serves significantly to reduce the corresponding cost and on-board weight.

The objects given to the invention are achieved with the help of a de-icing system for a fixed or rotary aircraft wing, the system comprising means for generating ultrasound that is transmitted at least locally to an outside surface of the wing, the wing including a base structure covered at least locally by at least one leading edge, wherein the system comprises:
- a perforated support structure arranged and held between the base structure and the leading edge;
- housings defined in the support structure and open towards the leading edge;
- piezoelectric actuators arranged in at least some of the housings in order to generate ultrasound waves that propagate in at least one direction substantially parallel to the outside surface;
- wiring connecting the piezoelectric actuators to an electrical control and power supply unit; and
- fastener means for fastening the leading edge to the base structure while coming into contact with the piezoelectric actuators arranged in their respective housings.

The de-icing system thus comprises piezoelectric actuators and a support structure for said piezoelectric actuators, the support structure being arranged and held between the base structure and the leading edge, the support structure including cells and being perforated to include empty spaces between said cells, each cell defining a housing that is open towards the leading edge, said piezoelectric actuators being arranged in at least some of the housings in order to generate ultrasound waves that propagate in at least one direction substantially parallel to the outside structure, wiring connecting the piezoelectric actuators to an electrical control and power supply unit, said system including fastener means for fastening the leading edge to the base structure and to said piezoelectric actuators arranged in their respective housings.

By way of example, the empty spaces pass right through the support structure, being open towards the leading edge and towards the base structure, while the housings are blind, being open solely towards the leading edge and not towards the base structure.

Consequently, the support structure may be embedded in a polymerizable resin by placing said resin in particular in the empty spaces.

In an embodiment in accordance with the invention, the support structure is made of elastomer.

The support structure is advantageously made of a material suitable for applying prestress to the piezoelectric elements. This applies in particular for elastomer. Under such circumstances, the support structure is prestressed to exert forces on the piezoelectric elements.

In an embodiment in accordance with the invention, the support structure, the base structure, and the leading edge are secured to one another with a polymerizable resin. For example, the polymerizable resin is placed in the empty spaces, both between the support structure and the base structure, and between the support structure and the leading edge.

In an embodiment in accordance with the invention, the elastomer structure defines cells each including a housing suitable for housing a piezoelectric actuator. By way of example, the piezoelectric actuators are adhesively bonded in the housings or to the leading edge.

In an embodiment in accordance with the invention, the elastomer support structure comprises a first perforated layer secured to the base structure via the polymerizable resin, and a second perforated layer secured to the first layer by connection means of the adhesive film type, the housings for the piezoelectric actuators being provided in said second layer. The resin may also contribute to bonding the two layers together.

In an embodiment in accordance with the invention, the cells are independent and are connected to one another by the polymerizable resin and by the leading edge.

In an embodiment in accordance with the invention, the cells are connected to one another in the first elastomer layer by elastomer connecting bridges forming integral portions of said first layer.

In an embodiment in accordance with the invention, the cells are hexagonal in shape.

In an embodiment in accordance with the invention, empty spaces remaining between the cells are filled with the polymerizable resin.

In an embodiment in accordance with the invention, the leading edge presents projecting studs on its inside face, which studs are engaged in the polymerizable resin contained in the empty spaces.

In an embodiment in accordance with the invention, the leading edge is made up of one or more portions so as to cover a continuous zone of the wing, or discontinuous zones thereof.

In an embodiment in accordance with the invention, the means for fastening the leading edge are adhesive means providing adhesive bonding with the piezoelectric actuators arranged in their respective housings.

In an embodiment in accordance with the invention, the leading edge is bonded to the second layer of the elastomer structure with which it is in contact.

In another embodiment in accordance with the invention, the means for fastening the leading edge comprise flexible fastener elements secured to the base structure and made of a material of the neoprene or silicone type, the ends of the leading edge being fastened thereto by adhesive, the base structure presenting a setback in register with the leading edge so as to define an empty gap in which the piezoelectric actuators are arranged.

In an embodiment in accordance with the invention, the de-icing system also extends under an outside wall of the wing that does not have a leading edge. Such a solution is advantageous insofar as some of the ice collects on the pressure-side surface, giving rise to a loss of performance, but to a lesser extent. It may then be advantageous to extend the protection system to said zone.

In an embodiment in accordance with the invention, the wiring is arranged on the wing either in distinct zones when the leading edge has a distinct portion for each of the zones, or overall in a single zone when the leading edge comprises a single piece over said zone. This enables the system to be controlled differently. Overall wiring means that the entire system needs to be put into operation as a whole, whereas it may be advantageous to manage de-icing in different zones and at different times. This solution is particularly advantageous if overall energy consumption would otherwise be too great.

In an embodiment in accordance with the invention, the piezoelectric actuators are constituted by disk-like ceramic elements presenting a shape that is substantially cylindrical. This enables ultrasonic wave propagation to be substantially isotropic in a plane parallel to the outside surface of the wing.

Alternatively, if it is desired for propagation to be more marked in one or more directions, it is possible to use ceramic elements of some other shape.

The objects given to the invention are also achieved by a fixed or rotary aircraft wing that includes a de-icing system in accordance with the invention.

The objects given to the invention are also achieved by a blade for a rotorcraft main rotor that includes a de-icing system in accordance with the invention.

The objects given to the invention are also achieved by a movable element of an aircraft fixed wing, such as a flap, which element includes a de-icing system in accordance with the invention.

The de-icing system in accordance with the invention presents the advantage of being inexpensive in terms of electrical power consumption. In addition, the system does not run any risk of localized overheating occurring, where such overheating is harmful for the mechanical cohesion of the wing.

The de-icing system in accordance with the invention also presents small size and small on-board weight, in particular by optimizing the associated wiring and control means. By way of example, the wiring may be organized on a matrix design making it possible to match as closely as possible the shapes of the cavities housing the actuators. Such wiring makes it possible to select one or more piezoelectric actuators for powering. Such wiring serves to reduce the quantity of wires compared with having individual connections to each piezoelectric actuator.

Another advantage of the de-icing system in accordance with the invention lies in the fact that a failure of one or more piezoelectric actuators does not prevent the de-icing system remaining effective overall. It is possible to define a percentage of defective actuators below which the effectiveness of de-icing remains unaffected.

Contrary to expectations, it is remarkable to observe that the leading edge does not need to be integrally bonded to an edge-carrier surface, and that releasing a certain percentage of its surface area does not harm the strength of its attachment. In an embodiment, this percentage may be at least 30%.

The invention also presents an advantage in terms of maintenance in that it is easier to dismantle.

BRIEF DESCRIPTION OF THE DRAWINGS

The invention and its advantages appear in greater detail from the following description of an embodiment given by way of illustration with reference to the accompanying figures, in which:

FIG. 1 is a section view of an embodiment of a de-icing system in accordance with the invention, incorporated in an aircraft wing;

FIG. 2 is a section view of another embodiment of a de-icing system in accordance with the invention incorporated in an aircraft wing;

FIG. 3 is a fragmentary plan view of a portion of the FIG. 1 de-icing system;

FIG. 4 is another fragmentary plan view of a portion of a FIG. 1 de-icing system;

FIG. 5 is a fragmentary plan view of a detail on a larger scale of the de-icing system in accordance with the invention;

FIG. 6 is a plan view of a blade for a helicopter main rotor including a de-icing system in accordance with the invention;

FIG. 7 is a cross-section view of an embodiment of the FIG. 6 blade that includes a de-icing system in accordance with the invention;

FIG. 8 is a cross-section view of another embodiment of the FIG. 6 blade that includes a de-icing system in accordance with the invention;

FIG. 9 is a cross-section of another embodiment of a blade including a de-icing system in accordance with the invention; and FIG. 10 is a section view of an additional embodiment of a de-icing system in accordance with the invention and incorporated in an aircraft wing.

Elements present in more than one of the figures and that are structurally and functionally identical are given the same numerical or alphanumerical references in each of them.

DETAILED DESCRIPTION OF THE PREFERRED EMBODIMENTS

FIG. 1 is a section view of an embodiment of a de-icing system in accordance with the invention incorporated in an aircraft wing.

The de-icing system comprises a support structure made of perforated elastomer 1 that is placed on and held between a base structure 2 and a leading edge 3. The base structure 2 is advantageously a structure based on longitudinal fibers taken from the group constituted by composite materials.

Housings 4 are defined in the elastomer structure 1 and they are open towards the leading edge 3.

In an embodiment in accordance with the invention, the elastomer support structure 1 defines individual cells 5, each comprising a housing 4 that serves to house therein a piezoelectric actuator 4*a*.

Advantageously, piezoelectric actuators are arranged in at least some of the housings 4 in order to generate ultrasound.

In an embodiment in accordance with the invention, the elastomer structure 1, the base structure 2, and the leading edge 3 are secured to one another using a polymerizable resin 6.

By way of example, the elastomer structure 1 comprises a first perforated layer 1*a* secured to the base structure 2 by means of a film of adhesive, and a second perforated layer 1*b* secured to the first layer 1*a* by means of said resin 6. The housings 4 for the piezoelectric actuators 4*a* are preferably provided in said second layer 1*b*.

In an embodiment in accordance with the invention, the cells 5 are connected together in the first elastomer layer 1*a* by connecting bridges 7 of elastomer that form an integral portion of said first layer 1*a*.

The first layer 1*a* advantageously presents grooves 1*c* and 1*d* at the interfaces of the cells 5, thereby providing better bonding with the resin 6. These grooves 1*c*, 1*d* constitute zones of reduced thickness for obtaining geometrical coherence for the set of connecting bridges 7, particularly since it is envisaged that the first layer 1*a* is to be obtained by machining a large block of elastomer material. Advantage may also be taken of these zones in order to use them for passing wiring and thus avoid the wiring providing mechanical cohesion between the various elements.

In another embodiment in accordance with the invention that is shown in FIG. 2, the cells 5 are independent and they are connected together solely by the polymerizable resin 6 and by the leading edge 3. The embodiment shown in FIG. 2 thus presents a first layer 1*a* that does not include any connecting bridges 7.

In an embodiment in accordance with the invention, empty spaces 1*a* remaining between the cells 5 are filled with the polymerizable resin 6.

In an embodiment in accordance with the invention and as shown in FIG. 1, the leading edge 3 presents projecting studs 8 on its inside face that are engaged in the polymerizable resin 6 contained in empty spaces 1*e* defined between the cells 5.

In the embodiment of FIG. 2, the leading edge 3 does not have any studs 8.

The de-icing system in accordance with the invention also includes adhesive means 9 for fastening the leading edge 3 on the piezoelectric actuators 4*a* arranged in their respective housings 4. The piezoelectric actuators 4*a* may, for example, be covered in a film of adhesive, of the epoxy kind, over their surfaces that come into contact with the leading edge 3.

Wiring 10 connecting the piezoelectric actuators to an electronic control and power supply unit is likewise installed in known manner. Each actuator is connected thereto. The wiring is embedded to a greater or lesser extent in the various actuators so as to be protected during handling, during installation, and once in service. The control/power supply portion is remote and does not form an integral portion of the blade. The wiring embedded in the elastomer is protected from certain kinds of vibration by the elastomer. Its reliability is thus improved.

FIG. 3 is a fragmentary plan view of a portion of the FIG. 1 de-icing system showing more particularly the first layer 1*a* and the wiring 10.

In an embodiment in accordance with the invention, the cells 5 are hexagonal in shape. The first layer 1*a* thus presents hexagonal elements 11 in the form of protuberances, each presenting a substantially circular central raised portion 12 defining the bottom of the corresponding housing 4. The hexagonal elements 11 are connected together by the elastomer connecting bridges 7.

The empty spaces 1*e* are for filling with the resin 6 and with the first layer 1*a* including the connecting bridges 7, thus serving significantly to reduce the tensions exerted on the wiring 10 placed on said first layer 1a.

FIG. 4 is another fragmentary plan view of a portion of the FIG. 1 de-icing system. FIG. 4 shows complementary hexagonal elements 13 that are identical to the hexagonal elements 11. These complementary hexagonal elements 13 are arranged, and where appropriate adhesively bonded, on the hexagonal elements 11 so as to define the peripheries of the housings 4. For this purpose, the complementary hexagonal elements 13 present respective through openings that are circular so as to be engaged on the raised central portions 12. The complementary hexagonal elements 13 thus constitute the second elastomer layer 1b. The elastomer layer 1 may thus be considered as being a honeycomb-type structure having two superposed housings 1a, 1b.

The complementary hexagonal elements 13 serve firstly to apply prestress to the piezoelectric actuator 4a of the ceramic type, and secondly to provide support and protection by damping vibration in the wiring and the connections.

The ceramic actuators and the wiring are preferably installed before finishing off the assembly with the second elastomer layer 1b.

The preferred object is to create waves that are substantially isotropic and at least partially parallel to the surface on which the piezoelectric actuators 4a are placed.

In a variant, the cells 5 may also present some other shape, for example they may be rectangular or triangular without going beyond the ambit of the invention.

FIG. 5 is a fragmentary plan view showing an enlarged detail of the de-icing system in accordance with the invention. In this embodiment, the de-icing system in accordance with the invention includes cells 5 of different types.

Some of the cells 5' thus do not contain piezoelectric actuators and therefore constitute inactive cells 5. These cells 5 that do not have piezoelectric actuators are used solely as resonant cavities that operate solely when the adjacent active cells 5 are in operation. By way of example, this may correspond to zones where it is known that ice cannot form, or at least not in critical manner, or where ice becomes detached easily, or where waves are transmitted well.

Furthermore, it is possible to provide cell-type filler means 5" that do not define corresponding housings.

In an embodiment of the de-icing system in accordance with the invention, it is possible to envisage using an electrically conductive leading edge 3 together with a conductive adhesive at the interface between said leading edge 3 and the piezoelectric actuators. The leading edge 3 may thus constitute common electrical ground for some or all of the piezoelectric actuators 4a. This makes it possible significantly to reduce the on-board weight of the wiring 10.

Furthermore, the piezoelectric actuators may be considered as capacitive loads. By separating said actuators into distinct blocks, each block may also be considered as a capacitive load. A block may thus be charged electrically and then discharged into another block. A fraction of the electrical energy used can thus be recovered and saved.

In an embodiment relying on distinct zones, it is thus possible to activate one zone that stores energy by deforming, and then on returning to its initial position it restores a fraction of that energy to the neighboring zone. This makes it possible to reduce the amount of energy that is stored and not used.

In another embodiment in accordance with the invention, the leading edge 3 is also adhesively bonded on the second layer 1b of the elastomer structure 1 with which it is in contact.

In an embodiment in accordance with the invention, the de-icing system also extends under an outer wall of the wing (not shown), which outer wall does not have a leading edge 3. This makes it possible to protect at least a portion of the pressure-side surface against ice forming thereon.

FIG. 6 is a plan view of a blade 14 for a helicopter main rotor, the blade including a de-icing system in accordance with the invention.

In an embodiment in accordance with the invention, the wiring 10 occupies the wing either in zones that are distinct in a transverse direction A, when the leading edge 3 includes a distinct portion for each of zones a, b, c, d, and e, or else in full in a longitudinal direction B over a single zone, when the leading edge 3 is a single piece over said zone.

The idea is to manage de-icing over time in localized zones (a, b, c, d, e). The way this is done depends on the amount of energy that is consumed by the set of actuators.

In an embodiment in accordance with the invention, the leading edge 3 comprises one or more portions so as to cover a continuous zone or discontinuous zones of the wing.

FIG. 7 is thus a cross-section view of an embodiment of the blade 14 of FIG. 6, the blade including a de-icing system in accordance with the invention and being associated with a leading edge 3 constituting a single portion. Each of the zones a, b, c, d, and e may thus be provided with such a leading edge 3.

FIG. 8 is a cross-section view of another embodiment of the blade 14 of FIG. 6 having a de-icing system in accordance with the invention that is associated with a leading edge 3 made up of two distinct portions. Each distinct portion of the leading edge 3 includes a respective de-icing system, for example. Each of the zones a, b, c, d, and e may thus be provided with a leading edge 3 of this type.

In an embodiment in accordance with the invention, the piezoelectric actuators 4a are constituted by disk-like ceramic elements presenting a shape that is substantially cylindrical. An electrode connected to the top and another electrode connected to the bottom of each of the ceramic elements enables said elements to be connected to the wiring 10 of the assembly. By way of example, the wiring comprises transmission lines associated with suitable connectors.

The circular shape of the ceramic elements constituting the piezoelectric actuators enables ultrasound waves to be caused to propagate isotropically in at least one plane parallel to the outside surface of the wing, and in particular to the leading edge 3.

In an example of assembling the de-icing system in accordance with the invention, after the first layer 1a has been installed on a work plane, the piezoelectric actuators 4a together with the wiring 10 are installed, and then the second layer 1b is put into place with an interposed film of adhesive. The leading edge 3 is then positioned over the entire assembly with a film of adhesive being interposed at least in register with the actuator. The assembly made in this way is then fitted on the structure of the blade and the resin 6 is injected into the empty spaces 1e so that said resin 6 provides adhesive bonding between the leading edge 3, the support structure 1, and the structure of the blade.

In an embodiment shown in FIG. 9, the means for fastening the leading edge 3 comprise flexible fastener elements 15 secured to the base structure 2 and made of a material of the neoprene or silicone type. The ends of the leading edge 3 are adhesively bonded to these flexible fastener elements 15. The base structure 2 of the blade 14 presents a setback 16 in register with the leading edge 3 so as to define an empty gap 17 in which the piezoelectric actuators are arranged. Such an assembly enables the leading edge 3 to be mounted with a so-called "floating" configuration.

The flexible fastener elements 15 are advantageously covered by the leading edge 3 in such a manner as to avoid said flexible fastener elements 15 suffering abrasion.

In another embodiment of the de-icing system in accordance with the invention, shown for example in FIG. 10, the support structure 1 is constituted by a set of individual blocks 18 each including a piezoelectric element 4a that is embedded at least in part in a material of said individual blocks serving to provide prestress. The localized spaces between the individual blocks 18 are filled with resin 6 and the leading edge 3 is advantageously adhesively bonded on the free surfaces of the piezoelectric elements 4a. For this purpose, each individual block 18 is advantageously constituted by a bottom portion 18a and an open top portion 18b facing the leading edge 3.

The connections comprise connection wires 19 and 20 connecting each piezoelectric element 4a to a connection harness 21 that is bonded via zones of adhesive 22 onto the base structure 2. Thus, during assembly of the de-icing system, it suffices to connect each individual block 18 to the connection harness 21 and to fasten the assembly together by means of the resin 6.

The de-icing system in accordance with the invention may be used for example to generate an ultrasound wave at a frequency that preferably lies in the range 5 hertz (Hz) to 100 kilohertz (kHz), the way of propagating through a medium that is constituted by the leading edge 3 together with frost or ice or dust. The piezoelectric actuators create shear stress at the interface between the leading edge 3 and the frost or ice that is in excess of 1.5 megapascals (MPa) which corresponds to the mean force of adhesion in shear of ice on a metal surface (made of aluminum, titanium, steel, etc.).

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A de-icing system for a fixed or rotary aircraft wing, the system being capable of generating ultrasound that is transmitted to an outside surface of the wing, the wing including a base structure covered at least in part by at least one leading edge, the system including:
   piezoelectric actuators;
   a support structure for the piezoelectric actuators, the support structure being arranged and secured between the base structure and the leading edge, the support structure including cells and being pierced to include empty spaces between the cells, each cell defining a housing that is open towards the leading edge, the piezoelectric actuators being arranged in at least some of the housings in order to generate ultrasound waves that propagate in at least one direction substantially in parallel with the outside surface;
   wiring connecting the piezoelectric actuators to an electrical control and power supply unit; and
   fastener means for fastening the leading edge to the base structure and to the piezoelectric actuators.

2. A de-icing system according to claim 1, wherein the support structure is made of an elastomer.

3. A de-icing system according to claim 2, wherein the elastomer support structure comprises a perforated first layer secured to the base structure by means of a polymerizable resin, and a perforated second layer secured to the first layer by connection means of the adhesive film type, the housings for the piezoelectric actuators being provided in the second layer.

4. A de-icing system according to claim 3, wherein the cells are connected to one another in the first elastomer layer by elastomer connecting bridges forming integral portions of the first layer.

5. A de-icing system according to claim 3, wherein the leading edge is bonded to the second layer of the elastomer structure.

6. A de-icing system according to claim 1, wherein the support structure is prestressed to exert forces on the piezoelectric actuators.

7. A de-icing system according to claim 1, wherein the support structure, the base structure, and the leading edge are secured to one another using films of adhesive.

8. A de-icing system according to claim 1, wherein the cells are structurally independent and are connected to one another by a polymerizable resin and by the leading edge.

9. A de-icing system according to claim 1, wherein the cells are hexagonal in shape.

10. A de-icing system according to claim 1, wherein the empty spaces between the cells are filled with a polymerizable resin.

11. A de-icing system according to claim 10, wherein the leading edge has an inside face presenting projecting studs engaged in the polymerizable resin contained in the empty spaces.

12. A de-icing system according to claim 1, wherein the leading edge is made up of one or more portions so as to cover a continuous zone of the wing, or discontinuous zones thereof.

13. A de-icing system according to claim 1, wherein the means for fastening the leading edge are adhesive means providing adhesive bonding with the piezoelectric actuators arranged in the housings.

14. A de-icing system according to claim 1, wherein the means for fastening the leading edge comprise flexible fastener elements secured to the base structure and made of a material of the neoprene or silicone type, the ends of the leading edge being fastened thereto by adhesive, the base structure presenting a setback in register with the leading edge so as to define an empty gap in which the piezoelectric actuators are arranged.

15. A de-icing system according to claim 1, wherein the de-icing system extends under at least a portion of the wing that does not include the leading edge.

16. A de-icing system according to claim 1, wherein the wiring is arranged on the wing either in distinct zones when the leading edge has a distinct portion for each of the distinct zones, or overall in a single zone when the leading edge comprises a single piece over the single zone.

17. A de-icing system according to claim 1, wherein the piezoelectric actuators are constituted by disk-like ceramic elements presenting a shape that is substantially cylindrical.

18. A fixed or rotary aircraft wing including a de-icing system in accordance with claim 1.

19. A blade for a rotorcraft main rotor, the blade including a de-icing system in accordance with claim 1.

20. A movable element of an aircraft fixed wing, the element including a de-icing system in accordance with claim 1.

* * * * *